United States Patent
Roovers

(10) Patent No.: US 7,602,926 B2
(45) Date of Patent: Oct. 13, 2009

(54) STATIONARY SPECTRAL POWER DEPENDENT AUDIO ENHANCEMENT SYSTEM

(75) Inventor: David Antoine Christian Marie Roovers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1007 days.

(21) Appl. No.: 10/519,051

(22) PCT Filed: Jun. 19, 2003

(86) PCT No.: PCT/IB03/02823

§ 371 (c)(1),
(2), (4) Date: Dec. 22, 2004

(87) PCT Pub. No.: WO2004/004297

PCT Pub. Date: Jan. 8, 2004

(65) Prior Publication Data

US 2005/0232440 A1    Oct. 20, 2005

(30) Foreign Application Priority Data

Jul. 1, 2002    (EP) .................................. 02077608

(51) Int. Cl.
*H04B 15/00* (2006.01)
(52) U.S. Cl. ....................... 381/94.2; 381/94.1; 704/226
(58) Field of Classification Search ....... 381/94.1–94.3, 381/91–92, 94.7, 122; 704/226, 233
See application file for complete search history.

(56) References Cited

U.S. PATENT DOCUMENTS

| 6,108,428 | A  | * | 8/2000  | Suzuki et al. ................ 381/101 |
| 6,151,397 | A  | * | 11/2000 | Jackson et al. ............. 381/71.4 |
| 6,952,482 | B2 | * | 10/2005 | Balan et al. ................. 381/94.1 |
| 7,158,933 | B2 | * | 1/2007  | Balan et al. .................. 704/226 |
| 7,440,891 | B1 | * | 10/2008 | Shozakai et al. ............. 704/233 |

FOREIGN PATENT DOCUMENTS

WO    WO9745995 A1    12/1997

\* cited by examiner

*Primary Examiner*—Vivian Chin
*Assistant Examiner*—Disler Paul

(57) ABSTRACT

An audio enhancement system (1) for speech recognition or voice control is described, comprising a signal input for carrying a distorted desired signal (z), a reference signal input, and a spectral processor (SP) coupled to both signal inputs for processing the distorted desired signal (z) by means of a reference signal (x) acting as an estimate for the distortion of the desired signal. The spectral processor (SP) is equipped for said processing such that a factor C' is determined, whereby said estimate is a function of the factor C' times the spectral power of the reference signal (x), and the factor C is determined as the spectral ratio between those components of the signals z and x, which are essentially stationary with time. Such a factor determined by stationary parts of those signals makes application of a critical speech detector in the audio enhancement system superfluous.

9 Claims, 2 Drawing Sheets

STATIONARY SPECTRAL POWER DEPENDENT AUDIO ENHANCEMENT SYSTEM

The present invention relates to an audio enhancement system, comprising a signal input for carrying a distorted desired signal, a reference signal input, and a spectral processor coupled to both signal inputs for processing the distorted desired signal by means of a reference signal acting as an estimate for the distortion of the desired signal, and relates to signals suited for use therein.

The present invention also relates to a system, in particular a communication system, for example a hands-free communication device, such as a mobile telephone, a speech recognition system or a voice controlled system, which system is provided with such an audio enhancement system, and relates to a method for enhancing a distorted desired signal, which signal is spectrally processed by means of a reference signal acting as an estimate for the distortion of the desired signal.

Such an audio enhancement system embodied by an arrangement for suppressing an interfering component, such as distorting noise is known from WO 97/45995. The known system comprises a number of microphones coupled to audio signal inputs. The microphones comprise a primary microphone for a distorted desired signal and one or more reference microphones for receiving the interfering signal. The system also comprises a spectral processor embodied by a signal processing arrangement coupled to the microphones through the audio signal inputs. In the signal processing arrangement the interfering signal is spectrally subtracted from the distorted signal to reveal at its output an output signal, which comprises a reduced interfering noise component.

It is a disadvantage of the known audio enhancement system that its interference signal cancelling capabilities depend on the application of a speech detector to be coupled to the speech processing arrangement. The operation of the known audio enhancement system critically depends on the proper detection of speech by such a speech detector.

Therefore it is an object of the present invention to provide an improved audio enhancement system and associated method not complicated by the presence and critical operation of a speech detector.

Thereto the audio enhancement system according to the invention is characterized in that the spectral processor is equipped for said processing such that a factor C' is determined whereby said estimate is a function of C' times the spectral power of the reference signal, and the factor C' is determined as the spectral ratio between those components of the signals z and x, which are essentially stationary with time.

Similarly the method according to the invention is characterized in that the said estimate is a function of a factor C' times the spectral power of the reference signal, and that C' is determined as the spectral ratio between those components of the signals z and x, which are essentially stationary with time.

The inventor found that the factor C' as defined is essentially insensitive to the desired signal. The factor C' only accounts for the ratio of the stationary components in the signals z and x. With this notion of the factor C' a reliable estimate can be provided for the distortion of the distorted desired signal which is actually input to the audio enhancement system, without the necessity to make use of a speech detector. This in turn results in improved and less critical distortion cancelling properties of the thus simplified audio enhancement system according to the invention. The improved distortion cancellation, especially holds in cases where the one or more reference signals comprise distortions such as e.g. noise, echoes, competing speech, reverberation of desired speech and the like. In addition the frequency dependent estimate for the distortion can be computed in any scenario where some reference signal(s) is(are) available.

Further advantages are that no explicit estimation of individual distortion components, such as noise floor or echo tail is necessary, while a combination technique with these components can be achieved easily, if required. This is particularly advantageous in cases of distortion for which no good estimation techniques exist, such as for microphone beam forming applications.

An embodiment of the audio enhancement system according to the invention has the characterizing features outlined in claim 2.

Usually both spectral powers normally having the form of averaged spectral powers are measured covering a certain number of time frames. Over a time span minima of both spectral powers are determined without substantial burden as to the computational complexity of the audio enhancement system according to the invention.

In a further embodiment of the audio enhancement system according to the invention the time span contains at least one pause in the distorted desired signal. This results in a well determined minimum and stationary spectral component value of the distorted desired input signal, which minimum accurately represents the stationary distortion in the input signal.

Preferably the time span lasts at least 4 to 5 seconds in order to normally included a speech pause in the distorted desired signal input to the audio enhancement system.

A still further embodiment of the audio enhancement system has the characterizing features outlined in claim 5.

In general the estimate of the distortion of the desired signal may be expressed advantageously by some positive function, for example in terms of signal power or signal energy, which in turn are defined by one of the above spectral units.

A practically preferred embodiment has the characterizing features of claim 6.

In that case the audio enhancement system comprises cost effective and easily to implement shift registers for storing values of the spectral powers and/or smoothed spectral powers.

At present the audio enhancement system and method according to the invention will be elucidated further together with their additional advantages, while reference is being made to the appended drawing, wherein similar components are being referred to by means of the same reference numerals.

Figure 1:
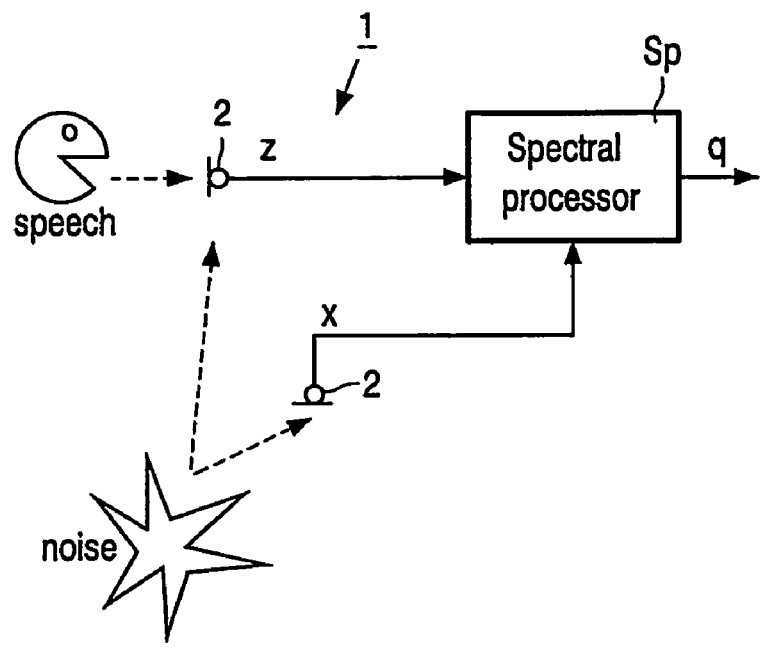
FIG. 1 shows a basic diagram of the audio enhancement system according to the invention.
Figure 2:
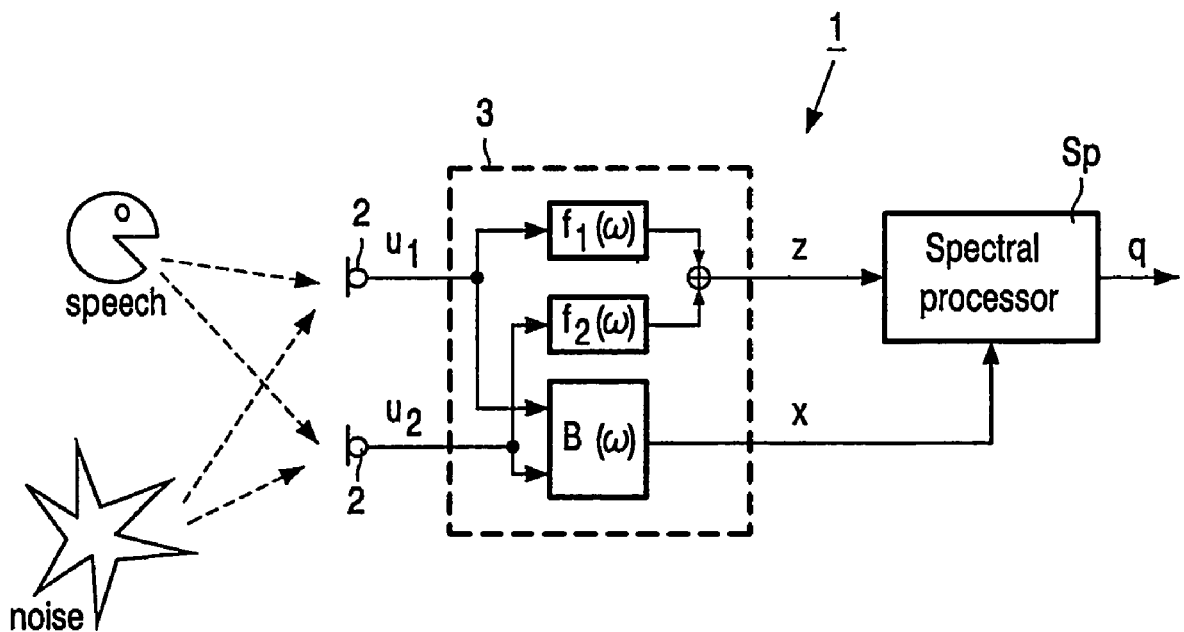
FIG. 2 shows the basic diagram implemented in a further embodiment of the audio enhancement system according to the invention having a filter and sum beamformer.

FIG. 1 shows a basic diagram of an audio enhancement system 1, embodied by a spectral processor SP, wherein frequency domain input signals z and x, and output signal q are shown. These frequency domain signals are block-wise spectrally computed in the processor SP by means of a Discrete Fourier Transform, for example a Short Time DFT, shortly referred to as STFT. This STFT is a function of both time and frequency, which may be expressed by the arguments kB and $lw_0$ or occasionally by the argument $w_k$ only. Herein k denotes the discrete time frame index, B denotes the frame shift, l denotes the (discrete) frequency index, $w_0$ denotes the elementary frequency spacing, and $w_k$ refers to the spectral component of index k. The input signal z indicates a distorted desired signal. It comprises the sum of the desired signal, generally in the form of speech, and distortions, such as noise, echoes, competing speech or reverberation of the desired signal. The signal x indicates a reference signal from which an estimate of the distortion in the distorted desired signal z is to be derived. The signals z and x may originate from one or more microphones 2, as shown in FIGS. 1 and 2. In a multi-microphone audio enhancement system 1 there are two or more separate microphones 2, to derive the reference signal from one or more microphones.

The audio enhancement system 1 may comprise adaptive filter means (not shown) for deriving the reference signal x therefrom. In that case the reference signal originates from the far end of a communication system.

In the embodiment of FIG. 1 the signal x only includes the reference or noise signal, whereas the signal z includes both the desired signal and the noise signal. FIG. 2 shows an embodiment of the audio enhancement system 1 for the case wherein the microphones 2 both sense speech and noise through microphone array signals $u_1$ and $u_2$. A filter and sum beamformer 3 is now coupled between the microphones 2 and the spectral processor SP. Again the spectral processor SP receives the above described signals z and x, with the signal x only comprising the reference or noise, and the signal z comprising both the desired and noise signal. The design of such a beamformer 3 is such that through respective transfer functions $f_1(w)$ and $f_2(w)$ the distorted desired signal z is obtained by a linear combination of the microphone array signals $u_1$ and $u_2$ respectively. The reference signal x is derived by a blocking matrix B(w) from the respective microphone array signals for projecting these signals into a subspace that is orthogonal to the desired signal. Ideally, output signal x of the matrix B(w) does not contain the desired speech but only distortions. Next the signals z and x are fed to the spectral processor SP for spectrally processing the distorted desired signal z by means of the reference signal x. The signal q from the processor SP is an output signal which is virtually free of distortion. It holds that q=G×z, where G is a gain function which will be explained hereafter.

The audio enhancement system 1 may be included in a system, in particular a communication system, for example a hands-free communication device, such as a mobile telephone, a speech recognition system or a voice controlled system.

The operation of the spectral processor SP is such that it acts as a controllable gain function for the subsequent frequency bins generated by the Discrete Fourier Transform (DFT) explained above. This gain function is applied to the distorted desired speech signal z, while the phase of the signal z is kept unchanged. For a good performance of the audio enhancement the type of gain function, that is in particular the estimate of the distortion which is present in the input signal is important. Depending on the optimization criterion dealt with various gain functions can however be used. Examples include spectral subtraction, Wiener filtering or for example Minimum Mean-Square Error (MMSE) estimation or log-MMSE estimation based on the spectral amplitude or magnitude, the squared spectral magnitude, the power spectral density or the Mel-scale smoothed spectral density of the signals involved. These techniques may be combined with the applications explained above for audio enhancement systems 1 having one or more microphones and/or loudspeakers.

In the case of for example a Wiener Filter type to be explained hereafter, the gain function implemented in the spectral processor SP has the form:

$$G(kB,lw_0) = 1 - \gamma P_{zz,n}(kB,lw_0)/P_{zz}(kB,lw_0) \quad (1)$$

where $P_{zz,n}(kB,lw_0)$ and $P_{zz}(kB,lw_0)$ are estimates for the power distribution of the distortion in the input signal z and the power distribution of the input signal z itself. $\gamma$ denotes the so called over subtraction factor serving to adjust the amount of suppression applied to the distortion. This way a trade-off can be made between the amount of distortion suppression and the perceptual quality of the output signal of the processor.

In equation (1) $P_{zz,n}(kB,lw_0)$ is generally not known and therefore has to be estimated. An estimate is proposed therefor, reading:

$$\hat{P}_{zz,n}(kB,lw_0) = C(kB,lw_0) * P_{xx}(kB,lw_0) \quad (2)$$

where the ratio term:

$$C(kB,lw_0) = \hat{P}_{zz}(kB,lw_0)/\hat{P}_{xx}(kB,lw_0). \quad (3)$$

Herein is $\hat{P}_{zz}(kB,lw_0)$ the time averaged spectral power of the distortion of the distorted desired signal z—measured during absence of the desired signal, such as speech—and $\hat{P}_{xx}(kB,lw_0)$ is the time averaged spectral power of the reference signal x. As a positive measure for the spectral power for example the spectral amplitude or magnitude, the squared spectral magnitude, the power spectral density or the Mel-scale smoothed spectral density of the signals involved could be taken. Implementation of equation (3) in the processor SP requires a speech detector. If such a speech detector does not perform accurately the desired speech may be affected, which leads to audible artifacts and must be prevented. However reliable speech detection in noisy conditions, such as in a car or factory is a difficult to perform task.

Generally by proposing a new factor C' as estimate for the factor C, which new factor is virtually insensitive to the desired speech, which is practically done by focusing on the stationary parts of the ratio of equation (3), a robust algorithm is created, without requiring a speech detector. In a practical implementation of this idea the factor C' is defined by the ratio of the minimum of the spectral power of the distorted desired signal (z) and the minimum of the spectral power of the reference signal (x), whereby both minima are determined during a time span. Represented in a formula it holds that:

$$C'(w_k;l) = \min_{m \in [1-L, \ldots, 1]} \hat{P}_{zz}(w_k;m) / \min_{m \in [1-L, \ldots, 1]} \hat{P}_{xx}(w_k;m). \quad (4)$$

The time span between 1−L and 1 time frames covers such a number L of time frames that it contains at least one pause present in the distorted desired signal. Generally this is a speech pause, if the desired signal is a speech signal. The minima so determined concentrates the ratio of equation (4), on the stationary components of the signals z and x respectively, which minima represent the stationary components of the distortion or noise. Normally the time span lasts at least 4 to 5 seconds. The factor C' given by equation (4) is determined based on the stationary components of the signals z and x. It is supposed to hold also in cases where non stationary components, such as speech is present in these signals and the operation performed by the spectral processor SP is based on that assumption.

The spectra in the numerator and denominator of the factor C' in equation (4) are obtained by smoothing the power spectra in first order recursions implemented in blocks LPF1 and LPF2 respectively both having smoothing constants β. The recursion implementation in these blocks comprises multipliers ×, adders +, and delay lines $z^{-1}$, coupled as shown to obtain smoothed power spectral density versions of the input x and z signals. For example the z signal spectrum then obeys the smoothing rule:

$$P_{zz}(w_k;l)=\beta P_{zz}(w_k;l)+(1-\beta)P_{zz}(w_k;l-1)$$

Where the smoothing constant β assumes a value between zero and one. The same rule may apply for the x signal spectrum. The value of β may be controlled in any desired way. Its value typically corresponds to a time constant of 50-200 milliseconds. Every time frame index m, each of these smoothed quantities is stored in a buffer, here in the form of shift registers SR1 and SR2 respectively. Out of the L smoothed values stored in each of the register positions the respective minimum values are fed to a divisor D to reveal the calculated value of C' in accordance with equation (4). Of course proper measures are taken to prevent division by a small value in the denominator.

When the average level of the desired speech signal is too high relative to the average level of the distortion, the problem may arise that the averages output by LPF1 and LPF2 are being dominated by the desired speech. This is due to the fact that it may take a long time for these averages to return to the low distortion level after occurrence of a high speech level. When this is the case the estimate of C' may still be influenced by the desired speech, leading to unwanted suppression of the desired speech signal. This effect is reduced by applying a multivariable compression function $f_c$ in the recursions for example in accordance with:

$$P_{zz}(w_k;l)=\beta P_{zz}(w_k;l-1)+(1-\beta)f_c\{P_{zz}(w_k;l), P_{zz}(w_k;l-1)\}$$

Figure 3:
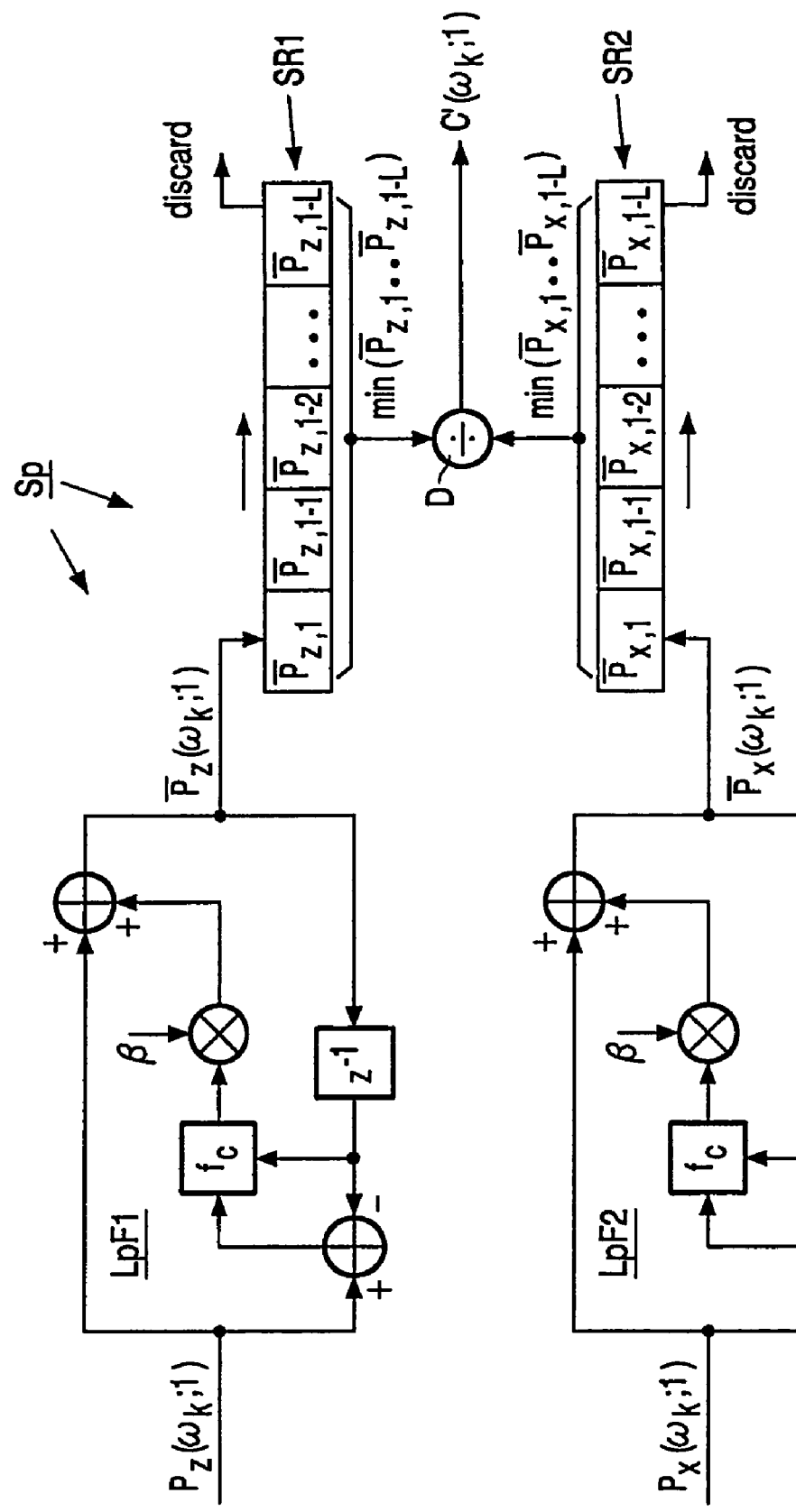
FIG. 3 shows a detailed embodiment of an audio enhancement system according to the invention.

The same rule may apply for the x signal. The compression function is chosen such that it reduces the update step of the recursion when the new input power value is relatively large with respect to values in the filters LPF1 and LPF2. Therefore the compression function reduces the influence of a high desired speech level on the averaged signal power. An example of a suited compression function is given by:

$$f_c(A, B)=\min\{A-B, \delta B\}$$

where δ is a positive constant. The smaller the value of δ, the slower a rise in the signal value is followed by the recursive filters LPF1 and LPF2. The embodiment including the compression block $f_c$ is depicted in FIG. 3. It may simply be omitted if no compression is needed.

Whilst the above has been described with reference to essentially preferred embodiments and best possible modes it will be understood that these embodiments are by no means to be construed as limiting examples of the system embodiments and method concerned, because various modifications, features and combination of features falling within the scope of the appended claims are now within reach of the skilled person.

The invention claimed is:

1. Audio enhancement system, comprising a signal input for carrying a distorted desired signal z, a reference signal input, and a spectral processor coupled to both signal inputs for processing the distorted desired signal by means of a reference signal x acting as an estimate for the distortion of the desired signal, characterized in that the spectral processor is equipped for said processing such that a factor C' is determined, whereby said estimate is a function of C' times the spectral power of the reference signal x, and the factor C' is determined as the spectral ratio between those components of the signals z and x, which are essentially stationary with time, wherein signal z includes both a desired signal and a noise signal, and signal x includes only the noise signal.

2. Audio enhancement system according to claim 1, characterized in that the factor C' is defined by the ratio of the minimum of the spectral powers of the distorted desired signal and the minimum of the spectral powers of the reference signal, whereby both minima are determined over a time span.

3. Audio enhancement system according to claim 2, characterized in that the time span contains at least one pause in the distorted desired signal.

4. Audio enhancement system according to claim 3, characterized in that the time span lasts at least 4 to 5 seconds.

5. Audio enhancement system according to claim 1, characterized in that the respective spectral powers are defined by some positive function of the spectral power concerned, such as the spectral magnitude, the squared spectral magnitude, the power spectral density or the Mel-scale smoothed spectral density.

6. Audio enhancement system according to claim 1, characterized in that the spectral processor comprises shift registers for storing values of the spectral powers.

7. Audio enhancement system according to claim 1, characterized in that the spectral powers are smoothed spectral powers.

8. System, in particular a communication system, for a hands-free communication device, including a mobile telephone, a speech recognition system or a voice controlled system, which system is provided with an audio enhancement system, the audio enhancement system comprising a signal input for carrying a distorted desired signal z, a reference signal input, and a spectral processor coupled to both signal inputs for processing the distorted desired signal by means of a reference signal x acting as an estimate for the distortion of the desired signal, characterized in that the spectral processor is equipped for said processing such that a factor C' is determined, whereby said estimate is a function of C' times the spectral power of the reference signal x, and the factor C' is determined as the spectral ratio between those components of the signals z and x, which are essentially stationary with time, wherein signal z includes both a desired signal and a noise signal, and signal x includes only the noise signal.

9. A method for enhancing a distorted desired signal z, comprising spectrally processing said signal by a special processor by means of a reference signal x acting as an estimate for the distortion of the desired signal, wherein said estimate is a function of a factor C' times the spectral power of the reference signal, and that the factor C' is determined as the spectral ratio between those components of the signals z and x, which are essentially stationary with time, wherein signal z includes both a desired signal and a noise signal, and signal x includes only the noise signal.

* * * * *